Patented Oct. 27, 1925.

1,558,598

UNITED STATES PATENT OFFICE.

CARLETON ELLIS, OF MONTCLAIR, NEW JERSEY, ASSIGNOR TO ELLIS FOSTER COMPANY, A CORPORATION OF NEW JERSEY.

OXIDATION OF AMMONIA.

No Drawing. Application filed April 26, 1918, Serial No. 231,014. Renewed January 13, 1925.

*To all whom it may concern:*

Be it known that I, CARLETON ELLIS, a citizen of the United States, residing at Montclair, in the county of Essex and State of New Jersey, have invented certain new and useful Improvements in the Oxidation of Ammonia, of which the following is a specification.

This invention relates to a process of oxidizing ammonia to form nitrous acid, nitric acid, ammonium nitrate, nitrite and the like and to catalyzers adapted therefor, and relates particularly to the use of a particular class of catalyzers for the treatment of a mixture of ammonia with air or oxygen, comprising exposure to a heated mass of catalytic material such for example as a material containing (or salt of) vanadic acid, or vanadium-containing, or analogous acid, under conditions adapted for efficient oxidation.

In the oxidation of ammonia especially with a powerful oxidizing catalyst such as platinum a good deal of difficulty is experienced in regulating the oxidation so as to not burn a relatively large part of the ammonia to the state of water and free nitrogen and in the present invention it is one object to provide a group of catalytic agents capable of oxidizing ammonia to nitrogen oxides or to ammonium nitrate as the case may be, without the production of any considerable amounts of free nitrogen from nitrogen compounds.

A series of such catalytic compounds are found in the salts of vanadium (and particularly those in which the vanadium is in the acid radical, notably vanadic acid) with the heavy metals, but in some cases the salts of the lighter metals such as calcium and magnesium are effective. For the production of oxides of nitrogen from ammonia the following catalytic agents have been found active; nickel vanadate, nickel iron vanadate, chromium vanadate, manganese iron vanadate, calcium vanadate, magnesium vanadate, lanthanum didymium vanadate, cobalt vanadate, copper vanadate, tin vanadate, and silver vanadate.

In addition to the above catalysts, the chromates of gold, tin and also the double chromate of cerium and lanthanum and the mixed silver manganese chromate have been found active, also silver molybdate and phosphate.

These catalyzers tend to effect a more complete oxidation, forming oxids of nitrogen rather than a slight oxidation of the ammonia molecule which would form free nitrogen.

In the oxidation of ammonia, in accordance with the present invention, with such catalytic agents, a mixture of air and ammonia, (the latter being present in the gas mixture to the extent of about five to six per cent or more, by volume) is passed into contact with the catalytic material which may be of a finely-divided nature and may be distributed on a carrier, or shaped into the form of porous granular masses, as for example, in the manner analogous to that described in my Patent No. 1,227,044 patented May 22, 1917. In other words, by treating for example, the chloride of a metal (e. g. $CoCl_2$) with the ammonium salt of the acidic material (e. g. ammonium vanadate) the reaction takes place with the formation of ammonium chloride, which is eliminated by heating, leaving a highly porous body, (perhaps cobalt vanadate, or at any event a solid body, preferably in a condition of intumescence containing cobalt as its base-forming metal and also containing vanadium functioning as the acid-forming element), which body is to be employed as the catalytic material, which material is pervious to gases. In preparing the catalyst in this example, the formation of cobalt vanadate may or may not be absolutely complete.

Throughout this specification, examples of proportions of ammonia and air are given by volume.

Granular porous masses produced as described above may be readily charged into a suitable catalytic chamber and afford a very porous or penetrable bed through which a current of ammonia-laden air may be passed freely so that no undue pressures are required to drive the gases through the apparatus, although if desired the whole system may be under superatmospheric pressure. A superatmospheric pressure of one to ten atmospheres may be used.

The most desirable temperature of the reaction mass to produce a maximum yield, is around a low red heat but this varies somewhat with the character of the catalytic agent and the manner in which it is prepared. The rate of flow of the gases also is regulated according to circumstances.

For example, if the catalytic material is supported on asbestos fibre, after a time the latter will tend to pack and form a felt through which the gases pass with difficulty requiring increasing pressures and leading to disturbances caused by lack of proper adjustment which are undesirable. While in some cases it may be feasible to use such asbestos-coated material in the present invention it is usually better to use the material in the form of granules, which granules preferably are porous and these fragments or granules are packed into a catalytic chamber which preferably is placed in a vertical position in order to prevent settlement of the catalytic material leaving a free channel at the top as not infrequently occurs when the catalytic material is placed in tubular horizontal catalytic chambers. By disposing such granular catalytic bodies in a vertical tube this difficulty is obviated.

The mixture of ammonia and air may be preheated or not according to the proportions of the mixture and the size of the apparatus. Large masses of catalyzer and liable to overheat if the air content is low in which case cooling is necessary or desirable. The regulation of the temperature in large masses of catalyzer is attained by introducing a mixture of air with ammonia in excess, and after the reaction has started at one end of the catalyzer chamber, additional air is added at one or more points in the catalyzer mass through distributing tubes, until a sufficient amount of air is introduced to completely oxidize the ammonia to the products desired. Thus the final air content may be represented by the equivalent of adding five or six per cent of ammonia to the air mixture entering the chamber. Or a much larger proportion of ammonia may be used so that the total air employed is precisely the equivalent of that required for the complete oxidation of ammonia to NO or $NO_2$, as desired. In other cases ammonia may be used in excess of the total air employed in order to better control the temperature, and when pure nitrogen is required as a by-product, whereby it is possible to more completely burn out the oxygen. The excess of ammonia or ammonium salt is duly removed or recovered. When the ammonia is used in the exact proportion required for combination with the oxygen present to produce $NO_2$, an equilibrium is reached which prevents the complete union of oxygen, thereby causing the nitrogen to be contaminated with oxygen and unfit for use in the manufacture of ammonia by the synthetic process without resort to extensive purification methods.

Nitrous oxide ($N_2O$) is formed by heating ammonium nitrate. Hence if ammonium nitrate is formed in the catalytic process in the earlier stages of the catalytic conversion when an excess of ammonia is present with nitric and nitrous oxides there always is the possibility of decomposition caused by the high temperature to which the material is subjected, resulting in the formation of nitrous oxide which of course cannot be absorbed in alkaline solutions. In case such reaction goes on to an excessive degree under imposed conditions, the nitrous oxide may be separately collected.

The oxidation of the ammonia also may form nitric oxide (NO) which in the presence of air eventually forms nitrogen tetroxide or peroxide ($N_2O_4$). Nitrogen peroxide reacts with nitric oxide to form nitrogen trioxide ($N_2O_3$) which may be absorbed by alkali to yield nitrites.

Nitrogen peroxide with water forms nitric acid and liberates nitric oxide which in the presence of air is oxidized to nitrogen peroxide and ultimately the entire content of nitric oxide, in the presence of air and moisture, becomes converted into nitric acid.

As a specific example of the manufacture of a catalyst particularly adapted for use in the oxidation of ammonia according to the present invention, the following example is given:—

Ammonium vanadate solution is mixed with cobalt chlorid solution, the mixture evaporated to dryness with constant stirring, and the dry mass heated up until the fumes of ammonium chlorid cease to be evolved. This produces highly porous, more or less granular product (perhaps cobalt vanadate), suitable for use in the process.

The following example of the oxidation of ammonia is given for the purpose of illustration.

The cobalt-vanadium containing catalyst prepared as above described, and in a porous granular state, is placed in a vertical tube, in a heating furnace, where the same is heated up until the temperature of the catalyzer mass reaches about 600 to 700° C. Air to which 6% of $NH_3$ gas has been added is then passed up through the catalyst, the air entering the catalyzer tube at about 100° C., and leaving at about 600° C. The pressure may be atmospheric, or somewhat above or below this. The gases, after cooling, may be led first into contact with an acid material to absorb unconverted ammonia, and then, either with or without the addition of oxygen or air, the gases are washed with dilute nitric acid and water (systematically) to produce nitric acid. The catalyst containing cobalt vanadate above referred to, in an intumesced condition has given very satisfactory results. The other cobalt compounds referred to are also satisfactory. The catalyst containing cobalt vanadate can be considered as containing oxygen, cobalt and vanadium, and may be regarded as an intimate association (perhaps complete chemical combination) of cobalt oxid with an oxid which increases its catalytic activity. To some extent, at least, the vanadium oxid or oxids of other acid-forming metals capable of existing in several stages of oxidation can also increase the catalytic activity of the oxids of the metals of the cobalt group (nickel and cobalt being the members of said group, these metals being closely related).

It is of course understood that the invention is not limited to these specific examples which are given for the purpose of illustration only.

To recapitulate, the invention relates to the process of oxidizing ammonia, specifically to form oxides of nitrogen and relates particularly to the process comprising exposing, preferably at a low or dull red heat, a mixture of ammonia and an oxygen-containing gas, such as air, to the action of an oxidizing catalyzer comprising a compound containing the oxides of at least two metals, one or both of which metals are capable of existing in more than one stage of oxidation, such for example, as cobalt vanadate, and the invention further comprises the process of oxidation of ammonia by an oxidation catalyst including metallic vanadates, especially as stated, the cobalt compound of vanadic acid. The invention also comprises a catalytic material adapted for the oxidation of ammonia to form nitrous acid and the like, which comprises a compound containing the oxides of at least two metals, one or both of which metals are capable of existing in more than one stage of oxidation and especially a compound of the type of cobalt vanadate embracing compounds of the cobalt group with an oxide capable of increasing its catalytic activity, for example oxid of vanadium such as vanadic acid; such compound preferably being in a form pervious to gases.

The elements above referred to may be distinguished from the other elements by their atomic weights. The International atomic weights for 1921 will be employed for this purpose, in certain of the appended claims.

The present application is in part a continuation of matter disclosed in the file of my copending application Serial No. 106,771, filed June 30, 1916.

I claim:

1. The process of oxidizing ammonia to form nitrous acid and the like which comprises passing a mixture containing ammonia and air into contact with a heated catalyzer comprising granules of cobalt vanadate.

2. The process of oxidizing ammonia to form nitrous acid, nitric acid, ammonium nitrate and the like which comprises passing a mixture comprising ammonia and oxygen into contact with an oxidizing catalyzer containing a salt in which a metal of the vanadium group appears as the acid-forming element, such compound also containing a metal capable of existing in more than one stage of oxidation.

3. The process of oxidizing ammonia to form oxides of nitrogen which comprises passing a mixture containing ammonia and air into contact with a catalyzer comprising a vanadate of a heavy metal.

4. The process of oxidizing ammonia to form oxides of nitrogen which comprises passing a mixture containing ammonia and an oxygen-containing gas into contact with an oxidizing catalyzer in a form pervious to gases and maintained at a low red heat; said catalyzer comprising a compound of a metal of the cobalt group with an oxygen acid of a metal capable of existing in more than one stage of oxidation.

5. The process of oxidizing ammonia to form oxides of nitrogen which comprises passing a mixture containing ammonia and an oxygen-containing gas into contact with an oxidizing catalyzer having a form highly pervious to gases and being maintained at a dull red heat; said catalyzer comprising a compound containing two metals one of which exists in said compound as the acid-forming element, and both of which are capable of existing with different valencies, in more than one stage of oxidation.

6. The process of oxidizing ammonia to form oxides of nitrogen which comprises passing a mixture of ammonia and an oxygen-containing gas into contact with a catalyzer comprising a compound of cobalt with an oxygen acid of a metal capable of existing in more than one stage of oxidation.

7. The process of oxidizing ammonia to form oxides of nitrogen which comprises passing a mixture containing ammonia and an oxygen-containing gas into contact with a catalyzer comprising a compound of a metal of the cobalt group with an oxygen acid of a metal capable of existing in more than one stage of oxidation; at least some part of said catalyzer being in a form readily pervious to gases.

8. The process of oxidizing ammonia to form oxides of nitrogen which comprises passing a mixture containing ammonia and an oxygen-containing gas into contact with a catalyzer maintained at a temperature corresponding to at least a dull red heat; said catalyzer comprising a compound of a metal of the cobalt group with an oxygen acid of a metal capable of existing in more than one stage of oxidation.

9. The process of oxidizing ammonia to form oxides of nitrogen which comprises passing a mixture containing ammonia and an oxygen-containing gas into contact with a highly porous gas-pervious catalyzer comprising a compound of the oxides of at least two metals, all of which are capable of existing in more than one stage of oxidation, all of which have atomic weights not less than 40.

10. The process of oxidizing ammonia to form oxides of nitrogen which comprises passing a mixture of gases containing ammonia and oxygen into contact with a substantially gas-pervious catalyzer maintained at a temperature of at least a dull red heat; said catalyzer comprising a compound of the oxides of two metals, both of which are capable of existing in more than one stage of oxidation, the metal in the acid radical having an atomic weight of from 51 to 52.

11. The process of oxidizing ammonia to form oxides of nitrogen which comprises passing a mixture containing ammonia and an oxygen-containing gas into contact with a catalyzer comprising a compound of a metal of the cobalt group with an oxygen acid of a metal capable of existing in more than one stage of oxidation.

12. The process of oxidizing ammonia to form oxides of nitrogen which comprises passing a mixture containing ammonia and oxygen-containing gas into contact with a catalyzer comprising a compound of the oxides of at least two metals, each of which metals is capable of forming more than one oxide, and at least one of which metals has an atomic weight between 51 and 63.

13. The process of oxidizing ammonia to form oxides of nitrogen which comprises passing a mixture containing ammonia and oxygen containing gas into contact with a porous granular catalyzer comprising a compound of the oxides of at least two metals, each of which metal is capable of forming more than one oxide, and the metal which acts as the acid-forming element being embraced within the fifth and sixth groups of the periodic system, with an atomic weight between 51 and 96.

14. The process of oxidizing ammonia to form oxides of nitrogen, etc., which comprises passing a mixture containing ammonia and air through a vertically disposed catalytic mass whose length is greater than its diameter and which comprises porous granular fragmental catalytic material comprising a compound of one heavy metal oxid with another heavy metal oxid each of said metals being capable of existing in more than one stage of oxidation, one of the said metals being embraced within the fifth and sixth groups of the periodic classification, such metals having atomic weights between 51 and 63.6.

15. The process of oxidizing ammonia to form oxides of nitrogen, etc., which com- prises passing a mixture of ammonia and air through a catalytic mass which comprises highly porous granular catalytic material comprising a non-noble metal vanadate.

16. The process of oxidizing ammonia to form oxides of nitrogen, etc., which comprises passing a mixture of ammonia and air through a catalytic mass which comprises porous fragmental catalytic material comprising cobalt vanadate.

17. The process of oxidizing ammonia to form oxides of nitrogen, etc., which comprises passing a mixture of ammonia and air through a mass of catalytic material of a highly porous nature, composed of a metal vanadate unassociated with an inert carrier or supporting material.

18. The process of oxidizing ammonia to form oxides of nitrogen, etc., which comprises passing a mixture of ammonia and air through a mass of material consisting of highly porous granules of a catalytic compound, said compound being composed of oxids of a plurality of metals each capable of forming more than one oxid, a salt containing a plurality of metals, one of which acts as the acid-forming element and appears in the fifth to sixth groups of the periodic system and which has an atomic weight between 51 and 96, and the base forming material in said salt having an atomic weight between 40.07 and 197.

19. The process of oxidizing ammonia to form oxides of nitrogen, etc., which comprises passing a gas current containing oxygen and ammonia through a pervious mass of intumesced material comprising an oxidizing catalyst; comprising a salt containing a plurality of metals, one of which acts as the acid-forming element and occurs in the fifth to sixth groups of the periodic system and has an atomic weight between 51 and 96.

20. A process of oxidizing ammonia which comprises passing a mixture comprising ammonia and oxygen in contact with a catalyst containing a plurality of metals in the form of a chemical compound, one of said metals occurring in the fifth to sixth groups of the periodic system, and all of such metals having atomic weights between 40 and 197.

21. In the oxidation of ammonia, the step of passing a mixture containing ammonia and air, in contact with a catalyzer containing oxygen combined with a metal of the cobalt group, and another metal, the oxid of which is capable of increasing the catalytic activity of the oxid of the metal of the cobalt group.

22. In the oxidation of ammonia, the step of passing a mixture containing ammonia and air, in contact with a catalyzer containing a metal of the cobalt group and a metal of the fifth group of the periodic classification, and oxygen, such three elements each being in a combined state.

23. In the oxidation of ammonia, the step of passing a mixture containing ammonia and air in contact with a porous catalyst comprising cobalt and oxygen, and an activating agent.

24. In the oxidation of ammonia, the step of passing a mixture containing ammonia and air in contact with a catalyzer containing oxygen, cobalt, and a material which is capable of increasing the catalytic activity.

25. In the oxidation of ammonia, the step of passing a mixture containing ammonia and air in contact with a porous catalyst comprising oxygen and both cobalt and a metal which is capable of acting as an acid-forming oxide.

26. In the oxidation of ammonia, the step of passing a mixture containing ammonia and air, in contact with a catalyzer containing oxygen, a metal of the cobalt group, and an acid-forming element which is capable of increasing its catalytic activity.

27. In the oxidation of ammonia, the process which comprises passing ammonia and a gas containing free oxygen, in contact with a catalyst containing oxygen, cobalt and vanadium.

In testimony whereof I have affixed my signature.

CARLETON ELLIS.